Figure 1:
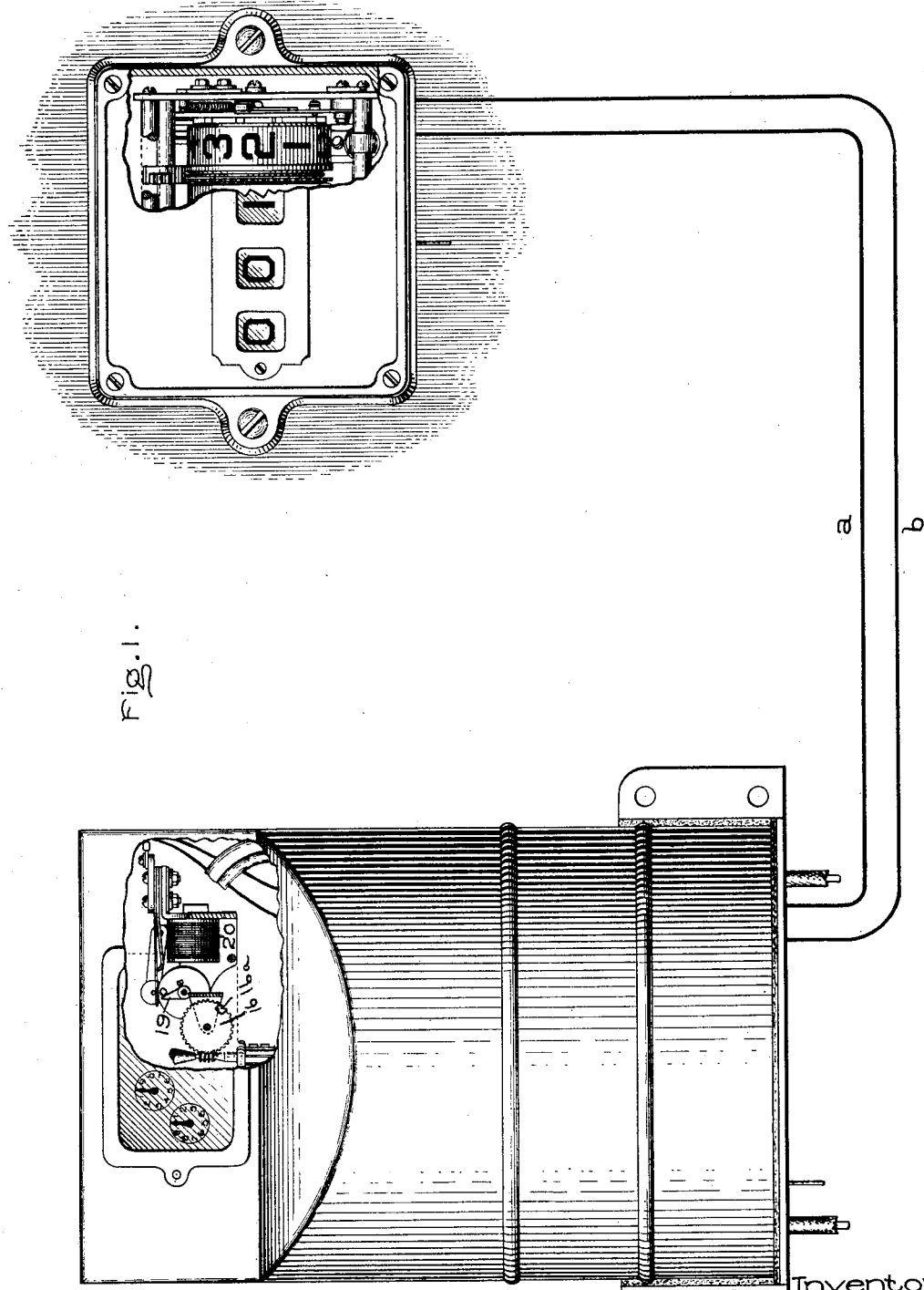

No. 751,007. PATENTED FEB. 2, 1904.
W. H. PRATT & A. J. R. FIEGO.
TELLTALE REGISTER.
APPLICATION FILED JUNE 24, 1901.
NO MODEL. 4 SHEETS—SHEET 1.

Witnesses:
Inventors,
Alexander J. R. Fiego.
William H. Pratt.

No. 751,007. PATENTED FEB. 2, 1904.
W. H. PRATT & A. J. R. FIEGO.
TELLTALE REGISTER.
APPLICATION FILED JUNE 24, 1901.
NO MODEL. 4 SHEETS—SHEET 2.

Witnesses:
Benjamin B. Hull,
Margaret E. Hooley,

Inventors,
Alexander. J. R. Fiego.
William H. Pratt.
By Albert G. Davis
Att'y.

No. 751,007. PATENTED FEB. 2, 1904.
W. H. PRATT & A. J. R. FIEGO.
TELLTALE REGISTER.
APPLICATION FILED JUNE 24, 1901.
NO MODEL. 4 SHEETS—SHEET 3.

Witnesses:
Benjamin B. Hill
Margaret E. Holley

Inventors.
Alexander J. R. Fiego.
William H. Pratt.
By Albert G. Davis
Atty.

THE NORRIS PETERS CO., PHOTO-LITHO., WASHINGTON, D. C.

No. 751,007. PATENTED FEB. 2, 1904.
W. H. PRATT & A. J. R. FIEGO.
TELLTALE REGISTER.
APPLICATION FILED JUNE 24, 1901.
NO MODEL. 4 SHEETS—SHEET 4.
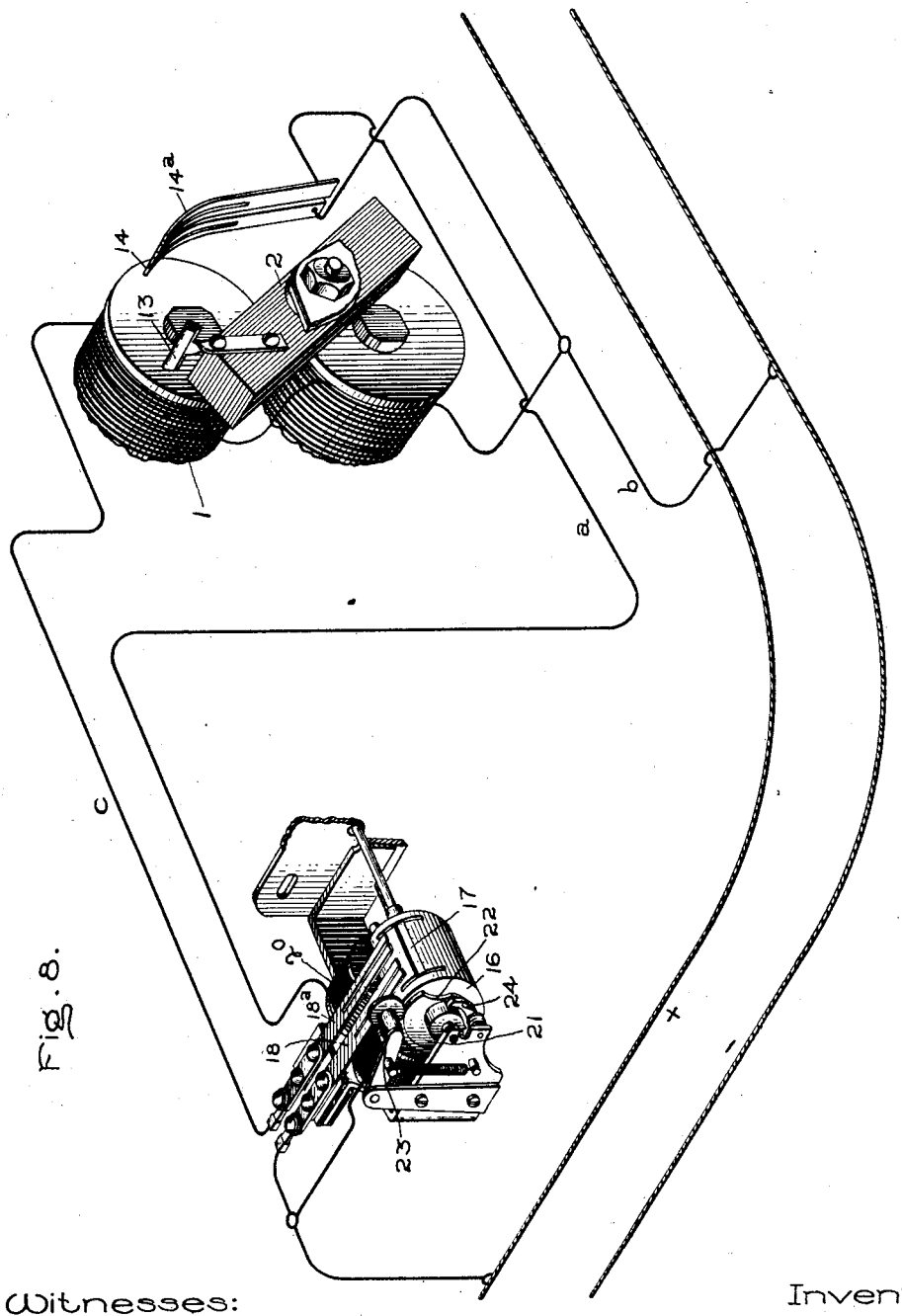
Witnesses:
Inventors.
Alexander J. R. Fiego.
William H. Pratt.
By
Att'y.

No. 751,007.

Patented February 2, 1904.

UNITED STATES PATENT OFFICE.

WILLIAM H. PRATT AND ALEXANDER J. R. FIEGO, OF LYNN, MASSACHUSETTS, ASSIGNORS TO GENERAL ELECTRIC COMPANY, A CORPORATION OF NEW YORK.

TELLTALE-REGISTER.

SPECIFICATION forming part of Letters Patent No. 751,007, dated February 2, 1904.

Application filed June 24, 1901. Serial No. 65,860. (No model.)

*To all whom it may concern:*

Be it known that we, WILLIAM H. PRATT and ALEXANDER J. R. FIEGO, citizens of the United States, residing at Lynn, county of Essex, State of Massachusetts, have invented certain new and useful Improvements in Telltale-Registers, of which the following is a specification.

This invention relates to electrically-operated registers for transmitting to a distance from an instrument of any suitable character a repeated record of that made by the instrument. For example, it is often desirable to repeat the indications of such an instrument as an electric wattmeter at some more or less distant point. These instruments are often comparatively large in size, and it is inconvenient or undesirable by reason of the room they occupy to place them on a switchboard. The tendency in modern practice is to place them at such points in the circuits whose currents they measure as will be least obstructive and employ on the switchboard a telltale device electrically connected with the meter in which its readings are repeated, thus conducing to a neater appearance of the board and economy of room. In other cases it is sometimes desired to have an instrument in the office of a station manager or other official which will indicate the record of one or any desired number of meters in the station. It is desirable that the instrument shall occupy a small space and shall be perfectly reliable in its action, so as to give a faithful repetition of the meter-readings. We provide a device of this kind in which a cyclometer-counter is periodically actuated by an electromagnet controlled by a contact device in the meter periodically operated when the meter is in action. We render the operation of the counter positive and definite in extent by means of a modified form of Geneva gear actuated by the controlling-magnet, by which slipping or overshooting of the operating parts is prevented. In order to prevent damage to the contact device in the meter from arcing, we provide a circuit-breaking device actuated by the telltale-register, which produces an effective opening of the control-circuit. To this end the device on which the movable contact is mounted is given a certain amount of lost motion with respect to the meter mechanism, so that when the circuit-breaking magnet is operated it is shifted rapidly away from the fixed contact. We provide also means for preventing burning of the contacts at the time of closure by effecting a snapping action at the instant of closure. Our invention involves, therefore, improvements in the transmitting mechanism installed in the meter and in the telltale device which repeats the readings.

The invention is generally applicable wherever it is desired to repeat at a distance the indications of a counter or like device.

The novel features will be more particularly hereinafter described and will be definitely indicated in the claims.

Figure 2:
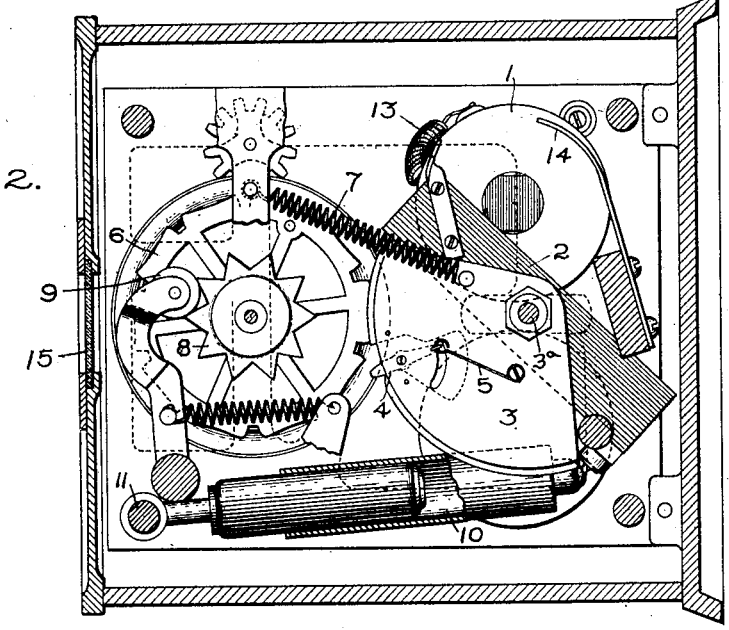
Figure 3:
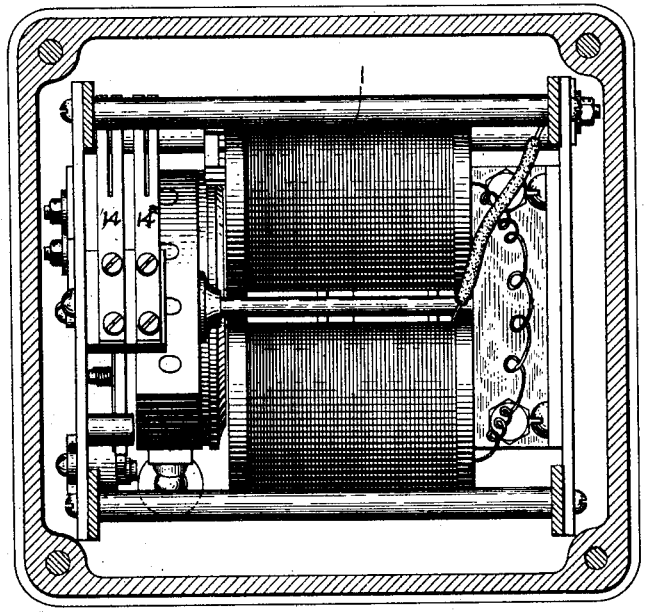
Figure 4:
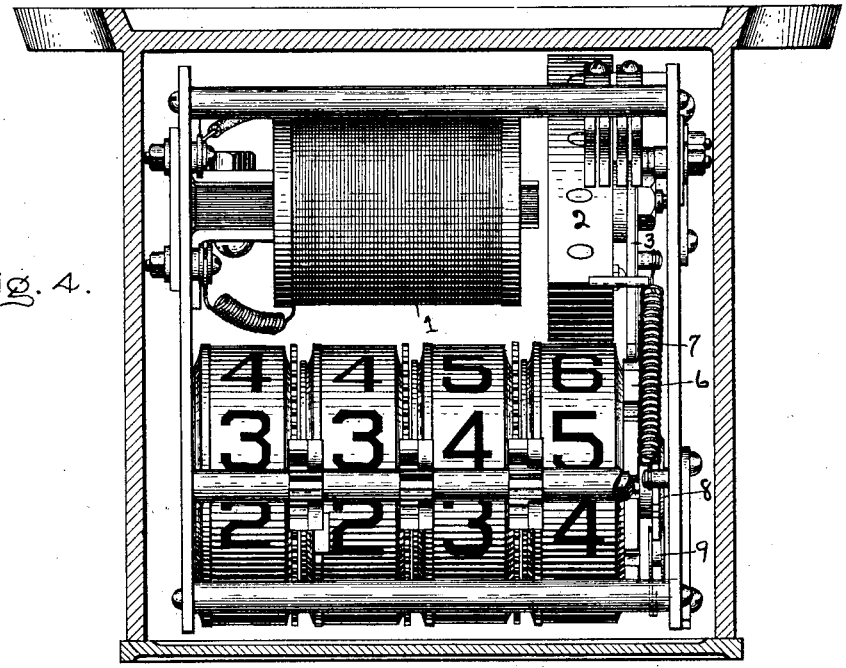
Figure 5:
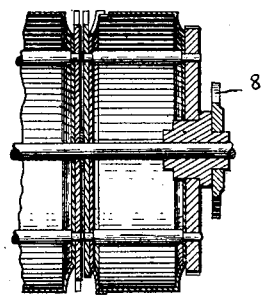
Figure 6:
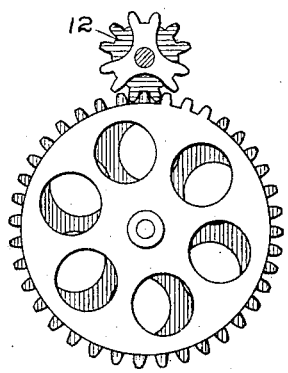
Figure 7:
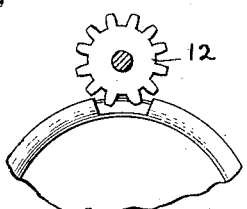

In the accompanying drawings, which illustrate the invention, Figure 1 is an elevation, with parts broken away, of a meter and its telltale-dial embodying our improvements connected by the control-circuits. Fig. 2 is a sectional view of the telltale mechanism. Fig. 3 is a top plan sectional view of the same. Fig. 4 is a sectional elevation on a plane at right angles to that indicated in Fig. 2 looking from the left. Figs. 5, 6, and 7 are details of a cyclometer-dial we prefer to employ, and Fig. 8 is a diagram showing the circuit connections with the electrically-operated parts.

The invention generally considered comprises a contact driven by gearing operated by a meter which periodically closes a circuit connected with the telltale device. The magnet of the latter shifts the counter one step each time the circuit is closed at the meter, and after it completes its movement a return-circuit is closed which effects a harmless rupture of the control-circuit at the meter.

Our invention involves improvements in two parts, the controlling devices operated by the meter and the register or telltale. We will first describe these parts separately and then describe their conjoint operation when connected by a control-circuit.

The construction of the telltale device will be understood from an examination of Figs. 1, 2, 3, and 4. This comprises an operating-magnet 1, the armature 2 of which has a long range of movement sweeping in front of the magnet-pole, as indicated in Fig. 2. The armature is pivoted on a shaft which carries a gear-sector 3, on which is pivoted a pawl 4, the rear end of which is loosely attached to a leaf-spring 5, one end of which is anchored to the sector. The pawl projects from the face of the sector so as to mesh with teeth of a gear-wheel 6, similar in principle to the well-known type of Geneva gear employed in the winding movement of Geneva watches. The mechanism differs, however, from Geneva gear in that it is operated by a reciprocatory instead of a rotary movement. Shoes on the end of the sector have curved faces, as indicated in Fig. 2, which coincide with coöperating curved surfaces on the gear 6, thus maintaining a stability of position of the latter when at rest. The sector 3 is normally drawn to the position indicated in Fig. 2 by a helical spring 7, one end of which is attached to the frame and the other to the sector. The intermittent gear 6 is securely fastened to the units-wheel of the cyclometer-dial. Secured to the intermittent gear also is a star-wheel 8, having a number of teeth corresponding to the number of digits of the units-wheel and coöperating with a spring-pressed roller 9, which rests between two teeth of the wheel and prevents striking of the corners of the sectors on the edges of the teeth of the intermittent gear, and also prevents this gear from turning backward when the magnet 1 is deënergized and the operating-pawl on the sector is drawn backward by spring 7 to its normal position. To the armature 2 is flexibly connected one end of a dash-pot 10, the other end of which is similarly attached to a post 11, the dash-pot conducing to a smooth operation of the armature and mechanism it controls. The several wheels of the counter may be connected by any approved method, that shown being of an efficient cyclometer type in which the successive digit-wheels are shifted one digit for a revolution of the preceding digit-wheel by means of normally idle loose gears, such as 12, Fig. 6, which bring adjacent wheels into clutch with one another once in each revolution of the lower digit-wheel and for a sufficient angular movement to shift the higher digit-wheel one digit. We deem it unnecessary to describe this mechanism in detail, as it forms no necessary part of our invention and is a well-understood type of cyclometer-dial. For the purpose of our invention any counting-train which consecutively increases its numbering may be employed, such counting mechanism being arranged in operative relation to the intermittent gear already described. The armature 2 carries a bridging contact tipped with platinum or silver, as indicated at 13, which cross-connects two flexible contacts 14 14$^a$, which may be similarly tipped, forming terminals of the control-circuit $a\,b$, Figs. 1 and 8, so that when the armature is operated and reaches the limit of its movement the terminal contacts 14 14$^a$ are bridged and the circuit closed from the lighting mains back to the meter, as will be presently more fully described.

The operation of the cyclometer is as follows: When the magnet 1 is energized, the sector is shifted, releasing the intermittent gear and bringing the tooth or pawl 4 into engagement with one of its teeth. The dash-pot 10 steadies the movement and prevents any jerking. The intermittent gear is shifted through an angle covering one-tenth of its circumference, thereby operating the digit-wheel it controls. The roller 9 drops into the next notch of the star-wheel and prevents any slipping of the wheel when the magnet is deënergized and the sector returns. On the return movement the pawl 4 slips over the face of the tooth of the intermittent gear and comes to rest in the position shown in Fig. 2. This operation is repeated as often as the magnet 1 is energized. The exposed digits are viewed through a glazed panel 15 in the side of the inclosing casing.

The transmitting device comprises a gear-wheel operated by the meter, which propels a drum 16, carrying a contact 17, adapted to bridge once in its revolution two contact-springs 18 18$^a$ to close circuit by wires $c$ and $b$, Fig. 8, through the operating-magnet of the telltale. The drum is connected with the drive-shaft by a loose connection, as indicated in Fig. 1 at 19. The drum carries an armature 16$^a$, which when the circuit is closed is in operative relation to a magnet 20, and when the latter is energized the armature is drawn full into its field and the drum shifted rapidly, thereby quickly separating the bridging contact 17 from flexible contacts 18 18$^a$ and preventing the formation of an arc. In order to insure a safe closure of the contact under the slow movement of the meter, we provide a disk 21, secured to one face of the drum, having a notch cut in it, as indicated at 22, into which falls a spring-pressed roller 23. When the drum is shifted to a position of close proximity to the engaging points of the springs 18 18$^a$, the pressure of the roller on the edge of the notch quickly shifts the drum and brings the bridging contact into firm engagement with the contact-springs. To prevent any backward movement of the drum, a pawl 24, engaging a ratchet on its axis, is provided.

The operation of the apparatus is as follows: When the meter is in movement, the contact-drum is turned, and at a determinate position in its revolution the notch 22 comes under the roller 23 and the circuit is rapidly closed, effecting a good hard contact and preventing damage from a slowly-changing imperfect engagement. An impulse is then transmitted from the supply-circuit (see Fig.

8) through the contacts 18 18ᵃ and bridging contact 17 to the telltale-operating magnet 1, thereby shifting the armature 2 of the telltale and raising the indication on the dial-digit. After this movement is completed the contact 13 bridges the contacts 14 14ᵃ, thereby closing a return-circuit over the wires *a b* to magnet 20 at the meter, which draws the armature carried by the drum full into its field and produces a rapid opening of the circuit at the control-point. This opening of the circuit demagnetizes the dial-operating magnet 1, and its armature is drawn back by its retractile spring to its normal position, opening the circuit at contacts 14 14ᵃ, thus leaving all parts in their normal position ready for a new cycle of operation when the meter has passed a further increment of energy.

Having thus described our invention, what we claim as new, and desire to secure by Letters Patent of the United States, is—

1. The combination of an electrically-controlled register comprising an operating-magnet, a retractile armature, a counter intermittently operated by said armature, an electric meter, a switch operated thereby, means whereby the switch closes circuit through the operating-magnet after a predetermined movement of the meter, and means for effecting a quick break of said circuit.

2. The combination of an electrically-operated register comprising an operating-magnet, a retractile armature, a counter for intermittently operating said armature, an electric meter, a rotary switch driven thereby, means permitting lost motion between the meter and switch, and means whereby the switch closes circuit through the operating-magnet once in each revolution.

3. An electrically-operated register comprising an operating-magnet, a retractile armature, a counter, a Geneva gear between the armature and counter, and a spring-retracting pawl acting on said gear only during forward movement.

4. An electrically-operated register comprising an operating-magnet, a retractile armature, a counter, intermittent gearing between the armature and counter, a detent for the counter acting at the end of each impulse, and a movable tooth in the intermittent gearing to permit retraction of the armature.

5. An electrically-operated register comprising an operating-magnet, a retractile armature, gear 3 having pivoted pawl 4, gear 6, counter-operated thereby, and means for holding the gear in fixed position when shifted.

6. The combination with an electrically-operated telltale-register, of a periodically-operated circuit-closer controlling the same, means permitting lost motion between the operating device and the circuit-closer, and means for utilizing said lost motion to rapidly break the circuit.

7. The combination with an electrically-operated telltale-register, of an electric circuit, a periodic circuit-closer therein, means for slowly shifting its contacts until they approximate, and a cam and an arm coöperating therewith for quickly shifting them into good conductive relation.

8. The combination with an electrically-operated telltale-register, of an electric circuit, a periodic circuit-closer therein, means for effecting a quick closure of the circuit, an electromagnet, and means operated thereby to effect a quick break of the circuit.

9. A telltale-register comprising an electrically-controlled counter, a circuit-controller therefor at a distant point, an electromagnet for effecting a quick break of contact in the controller, and a circuit-controller at the register for closing the circuit of said magnet after the counter has operated.

10. A repeating-register for an electric meter comprising an electrically-controlled counter, a circuit-controller at a distant point periodically operated by the meter, and means at the counter for automatically opening the circuit at the circuit-controller after the counter has operated.

11. A repeating-register for an electric meter comprising an electrically-controlled counter, a rotative circuit-controller at a distant point driven by the meter mechanism, means for shifting the contacts quickly together when they approximate, and electromagnetic means controlled by the mechanism of the repeating-counter for quickly breaking the circuit.

In witness whereof we have hereunto set our hands this 19th day of June, 1901.

WILLIAM H. PRATT.
ALEXANDER J. R. FIEGO.

Witnesses:
 DUGALD McK. McKILLOP,
 WILLIAM J. WOOLDRIDGE.